(12) United States Patent
Schmidt

(10) Patent No.: US 7,484,534 B2
(45) Date of Patent: Feb. 3, 2009

(54) PIPE CASING METHOD AND APPARATUS

(76) Inventor: David Schmidt, 2980 Poplar St., Highland, IL (US) 62249-2727

( * ) Notice: Subject to any disclaimer, the term of this patent is extended or adjusted under 35 U.S.C. 154(b) by 601 days.

(21) Appl. No.: 11/101,916

(22) Filed: Apr. 7, 2005

(65) Prior Publication Data
US 2006/0196032 A1    Sep. 7, 2006

Related U.S. Application Data

(60) Provisional application No. 60/657,942, filed on Mar. 1, 2005.

(51) Int. Cl.
*F16L 3/00* (2006.01)
(52) U.S. Cl. .................... 138/106; 138/108; 138/110; 138/159; 248/49
(58) Field of Classification Search ................ 138/106, 138/108, 156–159; 248/49
See application file for complete search history.

(56) References Cited

U.S. PATENT DOCUMENTS

| | | | | |
|---|---|---|---|---|
| 666,361 | A * | 1/1901 | Smead | 138/103 |
| 1,845,836 | A * | 2/1932 | Hauser | 138/106 |
| 2,741,268 | A | 4/1956 | Plunkett | |
| 2,914,090 | A | 11/1959 | Isenberg | |
| 3,581,776 | A | 6/1971 | Sheahan | |
| 3,863,679 | A * | 2/1975 | Young | 138/106 |
| 4,157,194 | A | 6/1979 | Takahashi | |
| 5,197,518 | A * | 3/1993 | Ziu | 138/113 |
| 5,238,328 | A | 8/1993 | Adams et al. | |
| 5,404,914 | A * | 4/1995 | Ziu | 138/113 |
| 5,469,891 | A | 11/1995 | Lund et al. | |
| 5,934,334 | A | 8/1999 | Gray, Jr. et al. | |
| 6,595,473 | B2 * | 7/2003 | Aoki et al. | 248/74.4 |
| 6,668,865 | B2 * | 12/2003 | Miyamoto et al. | 138/108 |
| 7,119,275 | B2 * | 10/2006 | Suzuki et al. | 174/503 |

* cited by examiner

*Primary Examiner*—Patrick F Brinson
(74) *Attorney, Agent, or Firm*—Stephen M. Nipper; Dykas, Shaver & Nipper, LLP

(57) ABSTRACT

A method and apparatus for encasing a carrier pipe using PVC sections. Top and bottom carrier pipe encasement shells are provided, with connectors utilized to connect the two shells together thereby encasing the carrier pipe. The connectors generally "number four-shaped" in cross section, having downward flanges for attaching to the bottom shells and a pair of pairs of upward flanges defining a pair of channels there-between for receiving the rims of the top shell there-between.

6 Claims, 2 Drawing Sheets

PIPE CASING METHOD AND APPARATUS

PRIORITY

This application is a non-provisional application which claims the priority date from the provisional application entitled PIPE CASING METHOD AND APPARATUS filed by David Schmidt on Mar. 1, 2005 with application Ser. No. 60/657,942, the disclosure of which is incorporated herein by reference.

BACKGROUND OF THE INVENTION

1. Field of the Invention

The present invention generally relates to protecting carrier pipes, and more particularly relates to a method and apparatus for enclosing carrier pipes within a casement.

2. Background Information

There are numerous dangers from leaking carrier pipes (oil, gas, chemical, etc. lines). What is needed is an easy and economical way of adding a casing pipe to an existing carrier pipe. The present invention solves these needs.

Throughout the United States and the world, many different types of fluids are transported through pipelines from one location to another. Examples of such fluids include petroleum products and other compounds that pose environmental risks if accidentally spilled into the environment. For instance, when an oil pipeline breaks, the resulting oil can pour into the environment creating an area which must be both contained and cleaned up in order to return the area to its prior environmental condition. As such, due to these potential environmental impacts as well as the potential for human harm, it is becoming more and more frequent that pipelines are required to be encased within a protective casing for containing/controlling the environmental impact of a leakage. On pipelines that have been laid that do not have such a casing, such casings are being retrofitted thereupon.

The main prior art way of encasing a carrier pipe is through encasing the carrier pipe with steel pipe. In doing so, a length of steel pipe is taken to the location of the carrier pipe, where an individual will then, using a torch or other equipment, cut the steel casing pipe in half thereby providing a pair of shells. These two shells will then be placed over the carrier pipe (preferably with spacers) and then a welder will be used to weld the two halves of the steel casing pipes back together thereby forming an encasement.

There are many problems with casing pipes in such a manner, including but not limited to, the weight of the metal pipe (additional costs associated with it in transporting the steel pipe to a work site) and labor (a considerable amount of labor goes into splitting the pipe and handling the pipe, as well as welding the pipe back together).

A number of prior art patents show various other (other than the split steel pipe method) methods of attempting to overcome the difficulties in the prior art. For instance, the patent to Young (U.S. Pat. No. 3,863,679) shows a pipeline assembly comprising a pipeline safety casing for encasing a carrier pipe. The Young safety casing comprises a pair of shells into which the carrier pipe is inserted. These shells having exterior flanges which are configured for bolting together.

The patent to Plunkett (U.S. Pat. No. 2,741,268) shows a frost casing for the use on encasing laser pipes and elevated water tanks. The Plunkett casings shows casings which are generally semi-wing shaped, wherein opposing ends are configured with holes therethrough for allowing them to be bolted together or butted against one another and overlap.

What is needed is a more cost effective manner of encasing a carrier pipe. Embodiments of the present invention solve this need.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a casing method and apparatus for carrier pipes.

In one embodiment of a method of the present invention, the present invention comprises a method of encasing a carrier pipe having a first side opposite to a second side. The method (in this particular embodiment) comprising a number of steps: providing a casing pipe, said casing pipe having a first end extending to a second end thereby defining a length; cutting said casing pipe along said length to create a first casing pipe shell and a second casing pipe shell, said cutting thereby defining a first rim opposite a second rim in each casing pipe shell; affixing a first connector portion generally at said first casing pipe shell first rim; affixing a second connector portion generally at said first casing pipe shell second rim; inserting said casing pipe in-between said first casing pipe shell and said second casing pipe shell; affixing said first connector portion to said second casing pipe shell first rim; and affixing said second connector portion to said second casing pipe shell second rim; wherein said first and second connector portions are thus held between said first and second casing pipe shell rims thereby reattaching said first and second casings together with said carrier pipe there between thereby encasing said carrier pipe therein. It is further preferred that the first connector portion comprises a first channel for receiving said second casing pipe shell first rim therein and that the second connector portion comprises a second channel for receiving said second casing pipe shell second rim therein. The preferred casing pipe being comprised of plastic. Additionally, it is preferred that the first connector portion is affixed to said first casing pipe shell first rim through use of at least one fastener and that the second connector portion is affixed to said first casing pipe shell second rim through use of at least one fastener, that the second casing pipe shell first rim is affixed to said first connector portion through use of at least one fastener and that the second casing pipe shell second rim is affixed to said second connector portion through use of at least one fastener. Further, optionally, the first casing pipe shell can then be sealed to the second casing pipe shell. Additionally, it is preferred that the method comprising the use of a plurality of spacers in-between said casing pipe shell rims for supporting said casing pipe therein and that the third and fourth casing pipe shell rims joined likewise together and connected with said first and second casing pipe shell rims to further encase said carrier pipe.

In one embodiment of an apparatus of the present invention, the apparatus is configured for encasing a carrier pipe. The apparatus comprising a first half-pipe shell and a second half-pipe shell. The first half-pipe shell having a first and second longitudinal rims. The second half-pipe shell having third and fourth longitudinal rims. The first longitudinal rim comprising a first connector defining a first channel for receiving said third longitudinal rim therein. The fourth longitudinal rim comprising a second connector defining a second channel for receiving said second longitudinal rim therein. The first and second half-pipe shells are fitted over said carrier pipe with said third longitudinal rim inserted into said first channel and said second longitudinal rim inserted into said second channel. The half-pipe shells are thus attached to one another thereby encasing said carrier pipe. It is preferred that the half-pipe shells are comprised of plastic. It is preferred that the third longitudinal rim is affixed to said first connector portion through use of at least one fastener, and wherein said second longitudinal rim is affixed to said second connector portion through use of at least one fastener. It is further preferred that a plurality of spacers exists in-between said casing pipe shell rims for supporting said casing pipe therein. It is further preferred that the apparatus comprise a third and fourth casing pipe shell rims joined likewise together and connected with said first and second casing pipe shell rims to further encase said carrier pipe.

The purpose of the foregoing Abstract is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
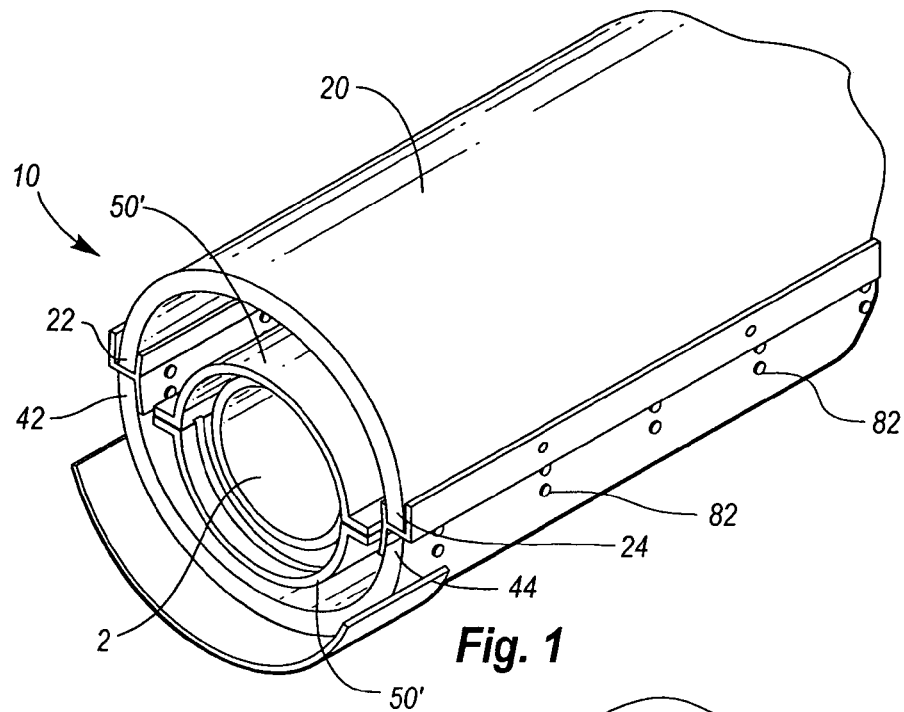
FIG. 1 is a perspective view of one embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Referring initially to FIG. 1, shown is one embodiment of the present invention. The present invention being a method and apparatus for encasing a carrier pipe.

Figure 2:
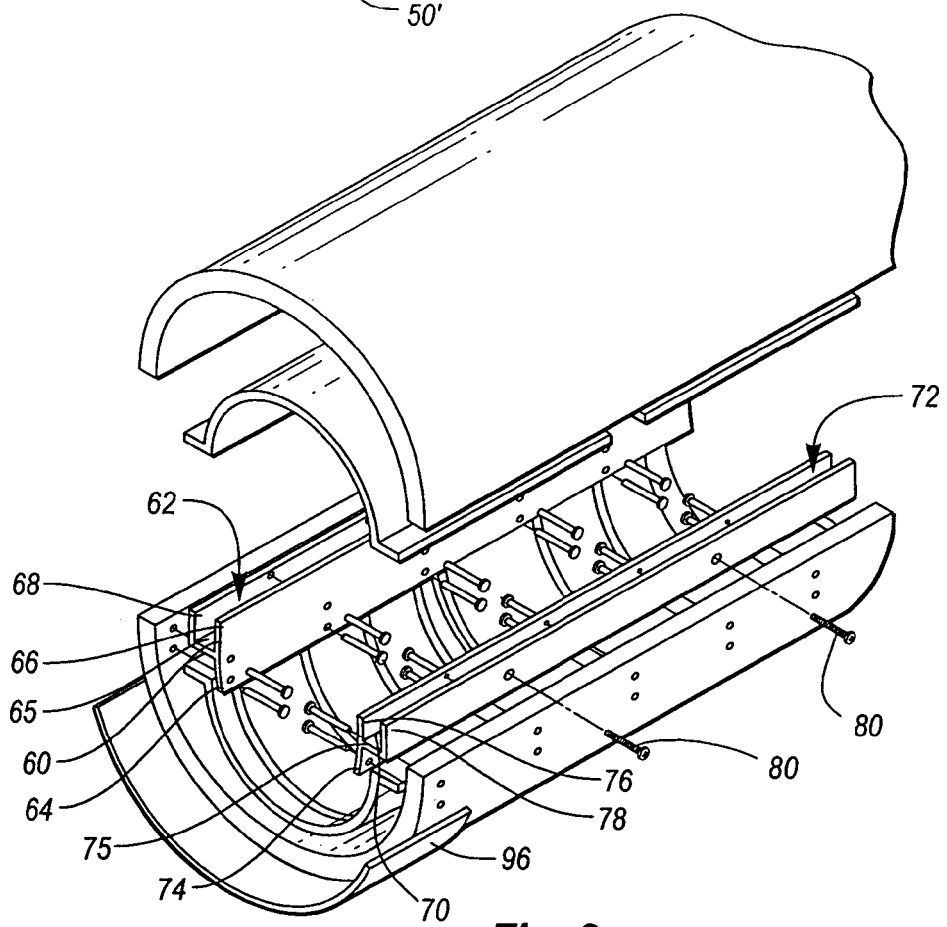
FIG. 2 is an exploded view of the embodiment of FIG. 1.
Figure 4:
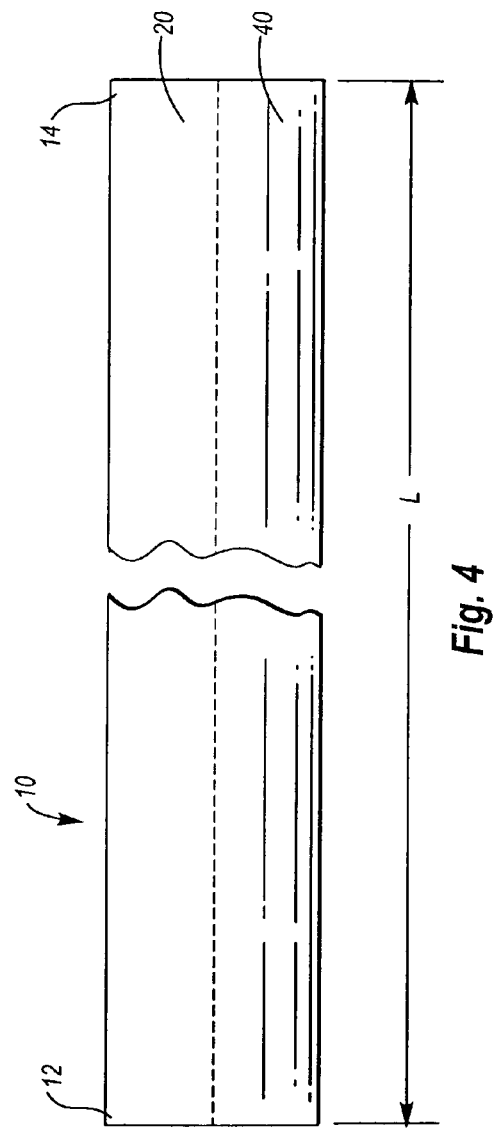
FIG. 4 is a partial, side view of another embodiment of the present invention.

FIG. 1 (FIG. 2 is an exploded view of FIG. 1) shows a carrier pipe 2. This carrier pipe 2 configured for carrying a fluid, such as crude oil. The present invention comprising a casing 10 for enclosing therein the carrier pipe 2. The casing 10 having a first end 12 extending to a second end 14 (as shown in FIG. 4), thereby defining a length (L). Along this length, the casing pipe 10 is preferably split into a first casing pipe shell 20 and a second casing pipe shell 40. While the present invention is referred to and discussed as being comprised of a single pipe which is split into two shells, it is expressly envisioned that the same invention could be otherwise manufactured, including but not limited, to extruding or otherwise forming the pipe shells independently. Additionally, the casing pipe shells 20, 40 are shown being generally mirror images of one another (the casing pipe being split generally in half). While being generally mirror images of one another is the preferred embodiment, it is not critical and other proportions and relationships are likewise envisioned.

Referring back to FIG. 1, the first casing pipe shell (top shell) 20 preferably comprises a generally semi-tubular piece having a body having a first rim 22 and a second rim 24, the body extending there between. Likewise, the second casing pipe shell 40 has a third rim 42 and a fourth rim 44 with the body of the shell extending there between. While it is envisioned that the casing pipe will be comprised of two halves of a generally tubular pipe, obviously other shapes (including but not limited to triangular shapes, rectangular shapes and other polygonal shapes) could be likewise used and the present invention's disclosure is not intended in any way to limit the application use and configuration of the present invention solely to such a structure.

The present invention also comprising of a first connector portion 60 and a second connector portion 70. These connector portions for connecting the top shell 20 to the bottom shell 40. In the embodiment shown, these connector portions 60, 70 being generally "4-shaped" in cross section and defining therein (respectively) a first channel 62 and a second channel 72. The connector portions 60, 70 each having a downward leg 64, 74 configured for attachment to the inside (or outside) portion of at least one of the casing pipe shells.

In the embodiment shown in FIG. 1, the downward leg 64 of the first connector portion 60 is particularly configured for connection to second casing pipe shell 40 adjacent to the third rim 42. Likewise, the downward leg 74 of the second connector portion 70 is configured for connection to second casing pipe shell 40 adjacent to the fourth rim 44.

While the present invention, particularly the embodiment shown in the drawings, is described with respect to both connector portions 60, 70 being attached to one of the pipe shells (in the embodiments shown, namely the bottom shell 40), obviously both of the connector portions could attach to either pipe shell, or one connector portion could attach to each pipe shell. Additionally, the connector portion does not necessarily need to be a separation portion, but could in the alternative be molded within or otherwise a part of at least one of the casing pipe shells.

Referring again to FIGS. 1 and 2, the first and second channels (62, 72), are preferably configured for receiving therein (respectively) the first rim 22 of the first casing pipe shell 20 and the second rim 24 of the first casing pipe shell 20.

In the preferred embodiment, as discussed above, the connector portions 60, 70 are attached to the second casing pipe shell 40, preferably through use of a plurality of rivets 82 or other fasteners. It is preferred, but not necessary, that pilot holes be provided in the sidewalls of the second casing pipe shell (bottom shell) 40 and within the first and second connector portions 60, 70 for assisting in this attachment. For instance, the fasteners could extend through said pilot holes.

The first and second rims (22, 24) of the top shell 22 are configured for receipt into the first and second channels (62, 72) thus attached to the bottom shell 40. The first channel 62 defined by an inner upward leg 66, a base 65 and an outer upward leg 68. The second channel 72 defined by an inner upward leg 76, a base 75 and an outer upward leg 78. It is preferred that the rims be inserted within their respective channels and that a plurality of fasteners, such as screws 80, be used to fasten the top shell thusly to the connector portions; for instance, by screwing through the outer upward leg, through the rim and into the inner upward leg (as shown). Thus, the carrier pipe can be encased there-between. Such a connection, in the preferred embodiment, is not creating a sealed pressure vessel, but merely encasing the carrier pipe. Although through use of an adhesive or other sealing, the two shells could be bonded and/or sealed together. It is preferred that the connectors attach to both shells and the shells themselves do not touch.

As is common with pipe encasements, it is preferred that a spacer 50, 50' be utilized inside the present invention for supporting and preferably centering the carrier pipe 2 within. Utilization of such spacers is a common thing as known in the prior art and the disclosure thereof is incorporated by a reference. In the embodiment shown, the spacer comprising two separate portions 50, 50'. While this is preferred obviously, a single piece or other multiple piece configurations of spacers is likewise envisioned. The utilization of such a spacer is not a required portion of the present invention, and is provided optionally therein.

Figure 3:
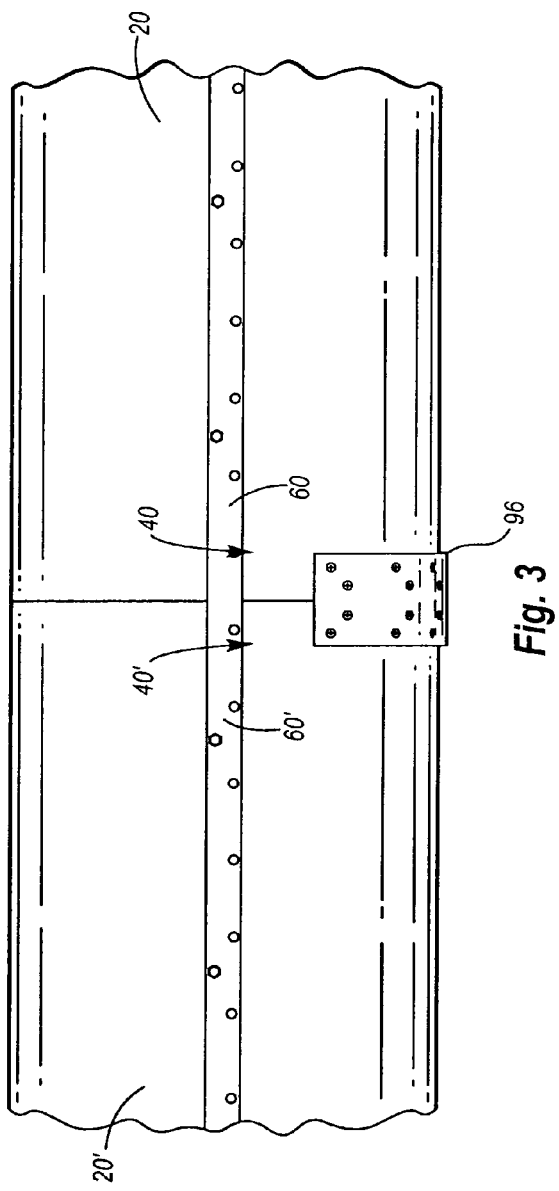
FIG. 3 is a partial, side view of two other embodiments of the present invention joined together.

Referring to FIG. 3, shown is two different casing pipes 10, 10' which have been butted against one another and fastened together through use of a curved end alignment plate 96. In preferred use, the end alignment plate would be attached to the first casing pipe 10, whereupon an adhesive (such as PVC cement, etc.) would be applied to the end of one or more of the casing pipes 10, 10'. The casings pipes would be forced and held together, and screws or other fasteners would be inserted through the end alignment plate 96 and into the casing pipes 10, 10' thereby bonding the two pipes together into a single inner-connected casing pipe assembly. While the embodiment shown in FIG. 3 shows second (bottom) casing pipe shells attached together, obviously upper (first) casing pipe shells would likewise be present and attached together if desired. While the present invention shows that the two second casing pipe shells are connected together, just as easily, the curved end alignment plate 96 could be rotated so that two or more adjacent casing pipe shells (whether they be top+bottom, top+top, or bottom+bottom) could be attached there together.

The preferred method of the present invention comprising a number of steps. In one embodiment, the first step providing a casing pipe, this casing pipe having a first end extending to a second end thereby defining a length. Second, cutting the casing pipe along the length to create a first casing pipe shell and a second casing pipe shell. This cutting thereby defining a first rim opposite a second rim in each casing pipe shell. Third, affixing a first connector portion generally at the first casing pipe shell first rim. Fourth, affixing a second connector portion generally at the first casing pipe shell second rim. Fifth, inserting the carrier pipe in-between the first casing pipe shell and the second casing pipe shell. Sixth, affixing the first connector portion to the second casing pipe shell first rim. Seventh, affixing the second connector portion to the second casing pipe shell second rim. Wherein the first and second connector portions are thus held between the first and second casing pipe shell rims thereby reattaching the first and second casings together with the carrier pipe there between thereby encasing the carrier pipe therein.

Preferably, the first connector portion comprises a first channel for receiving the second casing pipe shell first rim therein; the second connector portion comprises a second channel for receiving the second casing pipe shell second rim therein; the casing pipe is comprised of plastic; the first connector portion is affixed to the first casing pipe shell first rim through use of at least one fastener; the second connector portion is affixed to the first casing pipe shell second rim through use of at least one fastener; the optional step of sealing the first casing pipe shell to the second casing pipe shell is included; the second casing pipe shell first rim is affixed to the first connector portion through use of at least one fastener; the second casing pipe shell second rim is affixed to the second connector portion through use of at least one fastener; a plurality of spacers in-between the casing pipe shell rims for supporting the casing pipe therein are included; and/or third and fourth (or even more) casing pipe shell rims are likewise provided and joined likewise together and connected with the first and second casing pipe shell rims to further encase the carrier pipe.

In example (all of these steps being independently optional), one installation procedure for using the present invention on an existing carrier pipe would be as follows: (1) install spacers on carrier pipe (if spacers are desired and said spacers have not already been installed in split casing system); (2) install second casing pipe shell 40 (the preferred is PVC plastic) an support casing up against bottom of spacers; (3) if more than one section will be needed, slide another section (for instance casing pipe shell 40') into end alignment clips/plate 96, use PVC cement on the ends of the shells (40, 40') and self taping screws through the alignment plate/clips to attach the bottom shells (40, 40') to one another; (4) continue adding sections on bottom (if desired) until a desired length has been achieved; (5) before installing top shell(s) make sure bottom shells (40, 40') are well supported and will not move; (6) start the end of first casing pipe shell 20 into the "Number 4" shaped channel as close to seam between the bottom shells (40, 40') as possible; (7) when end of top half shell 20 has been started in the channel, use a self taping screw in slotted area in channel to hold in the top shell 20 place and keep top casing pipe shell rims from coming out of channel; (8) insert wedges in channel and push the top casing shell 20 down into channel; (9) continues moving down top half of casing 20 until casing 20 is seated in channel; (10) adjust top half of casing 20 so that top (20) and bottom ends (40, 40') are aligned; (11) after ends are aligned, use a pipe line up clamp at end of the casing (20, 40) to restore the casing to a more true round configuration; (12) when round configuration has been achieved, insert self taping screws through the outside of the channel through top shell pipe 20 and into hole on inside of channel; (13) continue this process down complete length of top casing 20; (14) if another section (20') is desired on top, insert another section just as the first was installed in channel leaving ½" space between sections 20 and 20'; (15) after section 20' is in channel and pipe clamp has been drawn down on end with the ½" space between top sections 20 and 20'; (16) tap on end of section 20' until it meets the end of section 20; (17) screw section 20' to the channel in the same manner as section 20 was attached (through connector portion 60'); and, (18) after all top sections (20, 20', etc.) have been installed, insert end seals and use CA-9 or equivalent to side seams and butt joints.

The preferred embodiment is not a pressure vessel. Casings and split casings are used to allow leaking products to escape out the ends, therefore the carrier pipe can be repaired rather than the leak continuing and contaminating the soil. Thus, the top shells and the bottom shells can be "sealed" together or merely fastened together (without sealing).

The present invention preferably comprised of plastic casing pieces (20, 40). The preferred plastic being PVC, however other types of plastic would likewise work and would be suitable for use in the present invention. Metals, natural materials, composites, rubber and ceramics would also work but are less preferred. As for the material of construction of the connector portions, the preferred connector portion is comprised of metal, such as aluminum. While this may be preferred, other materials may be used, including but not limited to natural materials, plastics, composites, rubber and ceramics.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. An apparatus for encasing a carrier pipe, said apparatus comprising:
   a first half-pipe shell having first and second longitudinal rims;
   a second half-pipe shell having third and fourth longitudinal rims;
   said first longitudinal rim comprising a first connector defining a first channel for receiving said third longitudinal rim therein;
   said fourth longitudinal rim comprising a second connector defining a second channel for receiving said second longitudinal rim therein;
   wherein said first and second half-pipe shells are fitted over said carrier pipe with said third longitudinal rim inserted into said first channel and said second longitudinal rim inserted into said second channel,
   wherein said half-pipe shells are thus attached to one another thereby encasing said carrier pipe, and wherein said third longitudinal rim is affixed to said first connector through use of at least one first fastener, and wherein said second longitudinal rim is affixed to said second connector portion through use of at least one second fastener and further comprising third and fourth half-pipe shell rims joined together and connected with said first and second half-pipe shell rims to further encase said carrier pipe.

2. The apparatus of claim 1, wherein said half-pipe shells are comprised of plastic.

3. The apparatus of claim 1, further comprising a plurality of spacers in-between said half-pipe shell rims for supporting said carrier pipe therein.

4. An apparatus for encasing a carrier pipe, said apparatus comprising:
   a first half-pipe shell having first and second longitudinal rims;
   a second half-pipe shell having third and fourth longitudinal rims;
   said first longitudinal rim comprising a first connector defining a first channel for receiving said third longitudinal rim therein;
   said second longitudinal rim comprising a second connector defining a second channel for receiving said fourth longitudinal rim therein;
   wherein said first and second half-pipe shells are fitted over said carrier pipe with said third longitudinal rim inserted into said first channel and said fourth longitudinal rim inserted into said second channel,
   wherein said half-pipe shells are thus attached to one another thereby encasing said carrier pipe, and wherein said third longitudinal rim is affixed to said first connector through use of at least one first fastener, and wherein said fourth longitudinal rim is affixed to said second connector through use of at least one second fastener and further comprising third and fourth half-pipe shell rims joined likewise together and connected with said first and second half-pipe shell rims to further encase the carrier pipe.

5. The apparatus of claim 4, further comprising a plurality of spacers in-between said half-pipe shell rims for supporting said carrier pipe therein.

6. An apparatus for encasing a carrier pipe, said apparatus comprising:
   a first half-pipe shell having first and second longitudinal rims;
   a second half-pipe shell having third and fourth longitudinal rims;
   said first longitudinal rim comprising a first connector defining a first channel for receiving said third longitudinal rim therein;
   said fourth longitudinal rim comprising a second connector defining a second channel for receiving said second longitudinal rim therein; and
   a plurality of spacers in-between said casing pipe rims for supporting said carrier pipe;
   wherein said first and second half-pipe shells are fitted over said carrier pipe with said third longitudinal rim inserted into said first channel and said second longitudinal rim inserted into said second channel, said third longitudinal rim is affixed to said first connector through use of at least one first fastener, said second longitudinal rim is affixed to said second connector through use of at least one second fastener, and said half-pipe shells are thus attached to one another thereby encasing said carrier pipe, and further comprising third and fourth half-pipe shell rims joined like wise together and connected with first and second half-pipe shell rims to further encase the carrier pipe.

* * * * *